United States Patent Office 2,729,683
Patented Jan. 3, 1956

2,729,683

DEHYDROCHLORINATION OF BENZENE HEXACHLORIDE

Alfred J. Kolka, Birmingham, and Harold D. Orloff, Detroit, Mich., assignors to Ethyl Corporation, New York, N. Y., a corporation of Delaware No Drawing. Application December 5, 1951,
Serial No. 260,105

7 Claims. (Cl. 260—648)

This invention relates to a process for manufacturing polychlorinated cycloalkenes.

A novel and useful class of chemical compounds comprise cyclohexene derivatives wherein a plurality of the carbon atoms of the ring are each substituted with a single chlorine atom and there is in the carbon ring one point of unsaturation. Typical examples of such polychlorinated cycloalkenes include 2,3,4,5,6-pentachlorocyclohexene and 1,2,3,4,5,6-hexachlorocyclohexene. Each of these materials exists in the form of a variety of stereo isomers wherein the spatial configuration of the chlorine and hydrogen atoms on the ring carbon atoms varies but wherein each chlorine-substituted carbon atom contains but a single chlorine atom. These materials have a wide range of usefulness. For example there are two allylic chlorine atoms on each which are highly reactive and undergo exchange reactions with other chemical groups. Furthermore, these materials have found utility as agricultural chemicals. For example the pentachlorocyclohexene is a potent insecticide. Furthermore the presence of the double bond in the carbon ring provides a point of attack for chemical reaction. For example those reactions characteristic of the double bond can be employed to convert each of these materials to important industrial chemicals. Thus, under oxidative conditions $\alpha,\beta,\gamma,\delta$-tetrachloroadipic acid is formed, a compound which is in itself a potent insecticide, one important use being the control of mosquito larvae. Still further important chemical products can be produced from these polychlorocyclohexenes.

These polychlorocyclohexenes exist in the form of a number of stereochemical isomers. These can be separated by various means such as fractional crystallization, distillation or chromatographic adsorption, for example over silicic acid. Certain typical physical properties of certain of these isomers are as follows, wherein the isomers are arbitrarily numbered for identification purposes:

| | M. P., ° C. | B. P., ° C./mm. Hg. |
|---|---|---|
| Isomer of 2,3,4,5-Pentachlorocyclohexene: | | |
| 1 | 58.2– 58.8 | |
| 2 | 70.5– 71.3 | |
| 3 | | 115–116/4 |
| 4 | 68.2– 68.6 | |
| Isomer of 1,2,3,4,5,6-Hexachlorocyclohexene: | | |
| 1 | 146.8–147.5 | |
| 2 | 124.5–125.0 | |
| 3 | 101.0–101.6 | |
| 4 | 139.8–140.4 | |

Before our discovery there was no route to these important chemical intermediates which was able to provide them in good yield from available raw materials by processes which can be employed on a commercial scale. One source of polychlorinated cyclic organic compounds which has become available in recent years on a large scale comprises the by-products obtainable when the insecticidal gamma isomer of benzene hexachloride, more properly defined as 1,2,3,4,5,6-hexachlorocyclohexane, is isolated in more or less pure form from the commercial product produced by the addition chlorination of benzene. One of the most successful commercial methods of recovering this gamma isomer, or lindane, comprises a separation based upon the solubility of the gamma isomer in lower aliphatic alcohols. When it is recognized that the gamma isomer of benzene hexachloride occurs to the extent of only 10 to 15 weight per cent of the crude benzene hexachloride, it may be appreciated that isolation of this isomer results in the accumulation of large quantities of chlorinated material which has no utility in itself. As a result many proposals have been made for utilizing such waste products with only limited acceptance. Therefore, one of the reasons for the limited manufacture of this highly important refined insecticide resides in the inability of effectively utilizing such waste products.

It is, therefore, one object of our invention to provide polychlorocyclohexenes in improved yield and from available raw materials. A further object is to provide an outlet for waste materials produced in the manufacture of the gamma isomer of benzene hexachloride. Other objects will be apparent from a further description of our invention hereinafter.

Our process by which the above objects are accomplished comprises the controlled dehydrochlorination of a fraction of the waste products obtained by the recovery of lindane from crude benzene hexachloride. In processes designed to recover the gamma isomer wherein the first separation is based upon the extraction of gamma-containing material from the crude benzene hexachloride followed by crystallization of this extracted solution, a filtrate from this crystallization is produced which contains, among other things, gamma benzene hexachloride, delta benzene hexachloride and heptachlorocyclohexane. This heptachlorocyclohexane results from over-chlorination during the benzene hexachloride production step, that is six chlorine atoms have been introduced in the cyclic six-membered group by addition and a seventh by substitution.

It has been proposed that the filtrate from the crystallization of the gamma isomer be recycled to the original extraction step. The amount of gamma isomer contained in this stream varies under different extraction conditions from 25 to as much as 50 weight per cent of the total gamma isomer originally present in the crude benzene hexachloride. This represents a severe loss of insecticidally active material and the inability of recovering in a useful form this material has greatly hindered the successful operation of such lindane processes. Furthermore the delta isomer which is present in large quantity imparts undesirable properties to the gamma isomer with which it is here admixed which far offsets its disadvantage as a simple inert diluent so far as insecticidal uses are concerned. However, it is found that the gamma isomer content of this filtrate is essentially non-recoverable, that is despite dissolution with fresh make-up solvent or upon evaporation of further quantities of the solvent followed by a crystallization step, the gamma isomer and the delta isomer co-precipitate. The gamma isomer cannot be readily recovered from this mixture as the solubility characteristics and the relative proportions of the two isomers are such that they do not lend themselves to such a separation. A typical example of the total solids obtained from such a discard solution from a gamma benzene hexachloride extraction step comprises about 20 to 40 weight per cent of the gamma isomer, 30 to 60 weight per cent of the delta isomer and 10 to 30 weight per cent of heptachlorocyclohexane.

We have discovered that by submitting the solids recovered from such a discard stream to a controlled dehydrochlorination process that it is possible to eliminate one molecule of hydrochloric acid from each of the three major components of this mixture. Thus, we obtain as a product a mixture of 2,3,4,5,6-pentachlorocyclohexene, hereinafter referred to as "pentachlorocyclohexene" and 1,2,3,4,5,6-hexachlorocyclohexene, hereinafter referred to as simply "hexachlorocyclohexene." Depending upon the conditions employed within the scope of the process of our invention, we can also obtain more or less of the trichloro- and tetrachloro-benzene. However, in one preferred embodiment of our process we conduct our dehydrochlorination step under such conditions that the polychlorobenzenes comprise only a minor proportion of our total dehydrochlorinated product.

In general our process can be described as follows: A mixture of gamma isomer, delta isomer and heptachlorocyclohexane in the proportions mentioned above is submitted to a thermal dehydrochlorination at a temperature in the range of about 150 to 500° C. We prefer to employ our process as a continuous operation whereby the hydrogen chloride produced is continuously withdrawn and the organic reactants and products are also continuously withdrawn from the reaction zone and submitted to a temperature reduction step. In order to prevent the complete dehydrochlorination of the polychlorocyclic material, we can reduce the temperature after emergence from the reaction zone by any one of several methods. For example, by directing the emergent stream into contact with a cooled surface we can arrest the dehydrochlorination at the desired point and therefore remove the products to a recovery or purification vessel. Alternatively the reaction products can be discharged from the reaction zone into a liquid medium whereby a quenching effect is accomplished. In one embodiment of this method of conducting our process the products are dissolved in such quench liquid and can be further processed for recovery or purification.

The process of our invention can be conducted either in the liquid or vapor phase, or in a mixed liquid-vapor phase. In general the temperature range in which we prefer to operate our process depends upon the type of process employed. Thus when conducting the operation by maintaining the feed stock as a melt we can employ temperatures in the range of between about 200 to 350° C. On the other hand when the feed stock is maintained in the vapor phase, we prefer to employ temperatures between about 250 and 400° C. In this latter embodiment of our process we can maintain a vapor phase reaction by introducing the feed along with an inert gas such as for example nitrogen. We have found that our process will operate in the absence of a catalyst either in the liquid, vapor or mixed liquid-vapor phases. However, if it is desired to maintain a high throughput and operate at the lowest practical reaction temperature, we can employ a catalyst to promote the dehydrochlorination to provide good yields of polychlorocyclohexenes. Thus when employing a liquid phase reaction in the presence of a catalyst, the temperature is preferably in the range of 200 to about 300° C. Likewise in the vapor phase modification of our dehydrochlorination process when a catalyst is employed, the reaction proceeds smoothly and in good yield in a temperature range of about 250 to 300° C.

When it is desired to employ our process catalytically a number of different types of materials can be employed. One method of carrying out our process catalytically comprises introducing a solid catalytic material into the reaction zone. For example in a batch operation in the liquid phase a melt comprising the gamma and delta isomers of benzene hexachloride and heptachlorocyclohexane in the proportions described above can be introduced a minor proportion for example 0.1 to 10 weight per cent of a solid catalyst such as charcoal, diatomaceous earth and other forms of siliceous material and the like.

These typical solid catalysts can also be employed in a continuous liquid phase operation wherein a reaction zone is packed with such material and the liquid feed stock passed through at the reaction temperature followed by a quench and recovery of the organic products and separation of the hydrogen chloride. Still other catalysts can be employed in conducting our process including so-called chemical catalysts, in particular, nitrogen-containing materials such as for example the alkyl amines, quaternary ammonium compounds, ammonium salts, heterocyclic nitrogen compounds, hydrazine and substituted hydrazines and the like. A still further class of catalysts which may be either considered the contact type or the chemical type include certain inorganic salts. Particularly useful among this class of materials are metal salts such as for example nickelous acetate, ferric chloride and sodium chloride.

The time during which the reaction mixture is subjected to the reaction temperature is not critical, but it is important to maintain a certain relationship between the contact or residence time, the temperature of the reaction and the particular composition of the feed stock. In general we have found that the preferred reaction time varies inversely with the temperature. For example, when conducting the process of our invention at temperatures in the range of 200 to 300° C. we have maintained the reaction mixture at the reaction temperature for as long as 30 minutes and still obtained good results. In operations conducted at temperatures in the range of 300° C. and higher we have successfully employed reaction time as low as six seconds.

In general we have found that extreme control of the reaction conditions is not essential to obtain good yields of the polychlorocyclohexenes. In other words, the conditions generally employed in aromatizing benzene hexachloride when applied to the novel starting material comprising predominantly the gamma and delta isomers of benzene hexachloride along with heptachlorocyclohexane provides good yields of the partially dehydrochlorinated products pentachlorocyclohexene and hexachlorocyclohexene.

The process of our invention apparently does not depend upon close control of the pressure as we have found the temperature and contact time to be the significant reaction variables. However, we prefer to employ a pressure at or near atmospheric pressure so as to simplify the operation of our process and provide a process which utilizes economical construction materials.

To further illustrate specific embodiments of the process of our invention the following examples will serve wherein all parts and percentages are by weight.

*Example I*

A solid mixture consisting essentially of 30 per cent gamma benzene hexachloride, 40 per cent delta benzene hexachloride and 30 per cent heptachlorocyclohexane was obtained by treating crude benzene hexachloride with one-half its weight of methanol at a temperature of 25° C., crystallizing a major portion of the gamma isomer of benzene hexachloride extracted and removing the methanol by evaporation from the filtrate. This solid mixture, 100 parts, was treated with one part of activated charcoal in a reaction vessel maintained at a temperature between 265 and 285° C. for a period of 23 minutes. Of the material reacted more than 25 per cent was converted to a mixture of pentachlorocyclohexene and hexachlorocyclohexene.

*Example II*

A mixture of gamma and delta benzene hexachloride and heptachlorocyclohexane substantially in the same proportions as in the foregoing example were passed through a reaction zone in the vapor phase at a temperature of 300° C. This reaction zone contained charcoal in such amount that there were two parts of charcoal for every one part of feed stock entering the reaction zone per minute. The residence time of the feed stock vapors in the reaction zone was six seconds. The reaction products were separated into an organic phase and a gaseous hydrogen chloride phase. The yield of penta- and hexachlorocyclohexenes was substantially the same as in Example I.

Having thus described the process for the production of pentachlorocyclohexene and hexachlorocyclohexene or selected dehydrochlorination of a mixture of gamma benzene hexachloride, delta benzene hexachloride and heptachlorocyclohexane, we do not intend that our invention be limited except as in the appended claims.

We claim:

1. A process for the manufacture of pentachlorocyclohexene and hexachlorocyclohexene comprising subjecting a mixture consisting essentially of gamma benzene hexachloride, delta benzene hexachloride and heptachlorocyclohexane to a temperature of between about 150 and 500° C. for not more than about 30 minutes and recovering the pentachlorocyclohexene and hexachlorocyclohexene.

2. A process for the manufacture of pentachlorocyclohexene and hexachlorocyclohexene comprising subjecting a mixture consisting essentially of gamma benzene hexachloride, delta benzene hexachloride and heptachlorocyclohexane to a temperature of between about 150 and 500° C. for not more than about 30 minutes, immediately cooling the reaction products to prevent further dehydrochlorination thereof, and recovering pentachlorocyclohexene and hexachlorocyclohexene therefrom.

3. A process for the manufacture of pentachlorocyclohexene and hexachlorocyclohexene which comprises introducing a mixture of polychlorocyclohexanes consisting essentially of between about 20 and 40 weight per cent gamma benzene hexachloride, between about 30 and 60 weight per cent delta benzene hexachloride and between about 10 and 30 weight per cent heptachlorocyclohexane into a reaction zone, maintaining said reaction zone at a temperature between about 150 and 500° C. for not more than about 30 minutes and recovering the pentachlorocyclohexene and hexachlorocyclohexene therefrom.

4. A process for the recovery of gamma benzene hexachloride, pentachlorocyclohexene and hexachlorocyclohexene comprising extracting crude benzene hexachloride with a lower monohydric aliphatic alcohol, crystallizing and recovering a product from the extract so formed, said product containing an enhanced proportion of the gamma isomer of benzene hexachloride, evaporating said alcohol from the crystallizer mother liquor so formed, subjecting the residue from said evaporation to a temperature in the range of 150 to 500° C. for not more than about 30 minutes, and recovering the pentachlorocyclohexene and hexachlorocyclohexene therefrom.

5. The process of claim 1 further defined in that the reactants are maintained predominantly in the liquid phase in the reaction zone.

6. The process of claim 1 further defined in that the reactants are maintained in the reaction zone predominantly in the vapor phase at a temperature between about 250 and 400° C. and the reaction zone contains a catalyst.

7. The process of claim 5 further defined that the temperature is between about 200 and 350° C. and the reaction zone contains a catalyst.

References Cited in the file of this patent

UNITED STATES PATENTS 2,569,441    Alquist et al. _____ Oct. 2, 1951

FOREIGN PATENTS 955,816    France _____ July 4, 1949

OTHER REFERENCES

Botyu Kagaku (Sci. Insect. Control), Nakazima et al., No. 15, II, (pp. 88, 114–117 relied on).